United States Patent
Rentschler et al.

(10) Patent No.: US 9,508,261 B2
(45) Date of Patent: Nov. 29, 2016

(54) METHOD AND DEVICE FOR OPERATING A VEHICLE

(71) Applicant: Robert Bosch GmbH, Stuttgart (DE)

(72) Inventors: Tobias Rentschler, Pforzheim (DE); Melanie Gugel, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/778,748

(22) Filed: Feb. 27, 2013

(65) Prior Publication Data

US 2013/0226407 A1    Aug. 29, 2013

(30) Foreign Application Priority Data

Feb. 27, 2012  (DE) .................. 10 2012 202 916

(51) Int. Cl.
| | |
|---|---|
| *G08G 1/16* | (2006.01) |
| *B60W 30/16* | (2012.01) |
| *B62D 15/02* | (2006.01) |
| *B60W 30/09* | (2012.01) |

(52) U.S. Cl.
CPC .............. *G08G 1/166* (2013.01); *B60W 30/09* (2013.01); *B60W 30/16* (2013.01); *B62D 15/0265* (2013.01); *B60W 2550/302* (2013.01); *B60W 2550/306* (2013.01); *B60W 2550/308* (2013.01); *B60W 2710/182* (2013.01)

(58) Field of Classification Search
CPC ........ G08G 1/16; G08G 1/164; G08G 1/166; G08G 1/167; B60W 2550/10; B60W 2750/00; B60W 30/10; B60W 30/12; B60W 30/17; B60K 31/0008

USPC ............ 701/41, 42, 300, 301; 180/167, 168, 180/169; 340/435, 436, 903
See application file for complete search history.

(56) References Cited

U.S. PATENT DOCUMENTS

| | | | |
|---|---|---|---|
| 6,473,690 B1* | 10/2002 | Joshi .............................. | 701/446 |
| 6,571,173 B1* | 5/2003 | Joshi .............................. | 701/446 |
| 8,392,062 B2* | 3/2013 | Oechsle et al. ................. | 701/41 |
| 8,423,250 B2* | 4/2013 | Kondou et al. ................. | 701/53 |
| 8,423,277 B2* | 4/2013 | Shirato ......................... | 701/301 |
| 8,510,041 B1* | 8/2013 | Anguelov et al. ............. | 701/445 |
| 2002/0002427 A1* | 1/2002 | Ishida et al. ..................... | 701/1 |
| 2003/0225519 A1* | 12/2003 | Miyahara ....................... | 701/301 |
| 2004/0193374 A1* | 9/2004 | Hac et al. ..................... | 701/301 |
| 2004/0236491 A1* | 11/2004 | Seto ................................ | 701/96 |
| 2005/0004731 A1* | 1/2005 | Bohm et al. .................... | 701/41 |
| 2009/0024357 A1* | 1/2009 | Aso et al. ..................... | 702/181 |

(Continued)

FOREIGN PATENT DOCUMENTS

| | | |
|---|---|---|
| DE | 101 37 292 | 3/2003 |
| DE | 10 2009 047 360 | 6/2011 |

(Continued)

*Primary Examiner* — Thomas G Black
*Assistant Examiner* — Ce Li
(74) *Attorney, Agent, or Firm* — Norton Rose Fulbright US LLP; Gerard Messina

(57) ABSTRACT

A method for operating a vehicle, including the tasks of detecting a dynamic parameter of a preceding other vehicle, computing an assessment criterion based on the detected dynamic parameter, computing a setpoint vehicle trajectory as a function of the assessment criterion, and adjusting an actual vehicle trajectory to the setpoint vehicle trajectory. Also described is a corresponding device and a computer program.

16 Claims, 2 Drawing Sheets

(56) References Cited

U.S. PATENT DOCUMENTS

| | | |
|---|---|---|
| 2009/0125204 A1* | 5/2009 | Kudo ............................. 701/96 |
| 2011/0178710 A1* | 7/2011 | Pilutti et al. .................. 701/301 |
| 2011/0227713 A1* | 9/2011 | Amann ........................ 340/435 |
| 2012/0323477 A1* | 12/2012 | Flehmig ....................... 701/301 |

FOREIGN PATENT DOCUMENTS

| | | |
|---|---|---|
| DE | 10 2010 011 497 | 9/2011 |
| JP | 9-221052 | 8/1997 |
| JP | 2000-11300 | 1/2000 |
| JP | 2007-261449 | 10/2007 |

* cited by examiner

METHOD AND DEVICE FOR OPERATING A VEHICLE

RELATED APPLICATION INFORMATION

The present application claims priority to and the benefit of German patent application no. 10 2012 202 916.8, which was filed in Germany on Feb. 27, 2012, the disclosure of which is incorporated herein by reference.

FIELD OF THE INVENTION

The present invention relates to a method and a device for operating a vehicle. Moreover, the present invention relates to a computer program.

BACKGROUND INFORMATION

A driver assistance system and a method for operating same are known from Published Unexamined German Patent Application DE 101 37 292 A1, in which surroundings data of a traffic situation are detected. In addition, data concerning movements of the vehicle are detected. The detected surroundings data are then compared to the data concerning movements of the vehicle. Assistance of a steering handling device is changed in accordance with the comparison.

SUMMARY OF THE INVENTION

An object of the exemplary embodiments and/or exemplary methods of the present invention concerns providing an improved method and an improved device for operating a vehicle.

Moreover, the object of the exemplary embodiments and/or exemplary methods of the present invention may also be regarded as providing a corresponding computer program.

These objects may be achieved by the respective subject matter described herein. Advantageous embodiments are the subject matter of the respective further descriptions herein.

According to one aspect, a method for operating a vehicle is provided. A dynamic parameter of a preceding other vehicle is detected. Based on the detected dynamic parameter, an assessment criterion is computed. A setpoint vehicle trajectory is computed as a function of the assessment criterion. An actual vehicle trajectory is then adjusted to the setpoint vehicle trajectory.

According to another aspect, a device for operating a vehicle is provided. The device includes a detection unit for detecting a dynamic parameter of a preceding vehicle. In addition, a computing unit for computing an assessment criterion based on the detected dynamic parameter and for computing a setpoint vehicle trajectory as a function of the assessment criterion is provided. Furthermore, the device includes a control unit for adjusting an actual vehicle trajectory to the setpoint vehicle trajectory.

According to another aspect, a computer program is provided which includes program code for carrying out the method for operating a vehicle when the computer program is executed on a computer.

The exemplary embodiments and/or exemplary methods of the present invention thus include in particular the concept of detecting a dynamic parameter of another vehicle which precedes, in particular immediately precedes, the host vehicle. An assessment criterion which is based on the detected dynamic parameter may thus be advantageously computed. This assessment criterion in particular is a criterion for whether a critical situation is present at the moment. A critical situation may arise, for example, due to the preceding vehicle braking heavily, thus reducing a relative distance between the host vehicle and the other vehicle. A critical situation may also occur in particular when the other vehicle moves into a lane of the host vehicle.

A setpoint vehicle trajectory is computed as a function of the assessment criterion, i.e., in particular as a function of how critical the situation is at the moment. The instantaneous actual vehicle trajectory is then adjusted to this setpoint vehicle trajectory, so that the critical situation is advantageously mitigated in such a way that, for example, a sufficient distance from the preceding vehicle is restored. In particular, in this case a distance between a longitudinal axis of the host vehicle and a longitudinal axis of the other vehicle is increased, so that in particular in the event of a collision, a more favorable orientation of the host vehicle relative to the other vehicle may be brought about. A longitudinal axis refers in particular to an axis along the longest extension of the vehicle.

The setpoint vehicle trajectory may be computed, and the actual vehicle trajectory is adjusted to the setpoint vehicle trajectory, when the assessment criterion is above or below a predetermined threshold value.

Within the context of the exemplary embodiments and/or exemplary methods of the present invention, an actual vehicle trajectory refers in particular to a trajectory, i.e., a three-dimensional curve, along which the vehicle is moving at the moment. Within the context of the exemplary embodiments and/or exemplary methods of the present invention, a setpoint vehicle trajectory refers in particular to a trajectory, i.e., a three-dimensional curve, along which the vehicle is supposed to move.

This control may be carried out by an intervention in a steering system. In this regard, the device may be referred to as a steering assistance system, for example. The term "lane keeping support" is generally used to refer to such a driver assistance system.

According to one specific embodiment, it may be provided that multiple dynamic parameters of the preceding other vehicle are detected. The computation of the assessment criterion is then carried out based in particular on the multiple dynamic parameters. In this regard, the same or different dynamic parameters may be detected.

In one specific embodiment, it may be provided that the dynamic parameter is detected continuously, i.e., on an ongoing basis over time.

According to another specific embodiment, it may be provided that a vehicle surroundings of an adjacent lane relative to an instantaneous vehicle position is detected, whereby, based on the detected vehicle surroundings, a permissible range for the setpoint vehicle trajectory is formed which includes the adjacent lane. This means in particular that the setpoint vehicle trajectory may be situated in this adjacent lane as a function of the vehicle surroundings of the adjacent lane. This means in particular that in the event of a critical situation, the host vehicle may evasively move into the adjacent lane, since the actual vehicle trajectory is adjusted to the setpoint vehicle trajectory, which may be situated in the adjacent lane. A distance between the respective longitudinal axes of the host vehicle and of the other vehicle is thus advantageously further increased, so that a risk of collision is advantageously further reduced. The adjacent lane may be provided immediately adjacent to the lane of the host vehicle.

In another specific embodiment, it may be provided that lane markings of a traffic lane of the host vehicle are detected. A further permissible range for the setpoint vehicle trajectory is formed which is within the lane markings. The setpoint vehicle trajectory may be computed by maximizing a distance between a longitudinal axis of the host vehicle and a longitudinal axis of the other vehicle. This means in particular that in this case, the setpoint vehicle trajectory is situated in the lane of the host vehicle, at the same time a distance between the respective longitudinal axes of the host vehicle and of the other vehicle being maximized. This means in particular that in this case, a boundary condition is present such that the host vehicle is not allowed to cross the lane markings, in order to advantageously avoid a collision with vehicles present in an adjacent lane.

However, if in addition a vehicle surroundings of the adjacent lane relative to the instantaneous host vehicle position, in particular relative to the lane of the host vehicle, is detected, it may be provided that a permissible range for the setpoint vehicle trajectory also includes the adjacent lane, in particular if no other objects, in particular vehicles, are present in the vehicle surroundings of the adjacent lane which could collide with the host vehicle in the event of a lane change. This means in particular that, as a function of the vehicle surroundings of the adjacent lane, the further permissible range for the setpoint vehicle trajectory may be extended in such a way that this range includes the adjacent lane.

According to another specific embodiment, it may be provided that a brake parameter corresponding to a requested braking power is detected, the assessment criterion being computed based on the brake parameter. This means in particular that, for example, the particular pressure with which a driver actuates a brake pedal is detected. The brake parameter may thus correspond in particular to a brake pressure applied by the driver. It is generally the case that the more critical a driving situation, the more strongly the driver will actuate the brake pedal. Thus, another parameter is advantageously formed which is a reliable criterion for the presence of a critical situation. In this regard, such a critical situation may advantageously be recognized quickly and reliably so that appropriate measures may be taken. In the present case, this involves in particular computing a setpoint vehicle trajectory and adjusting the actual vehicle trajectory to the setpoint vehicle trajectory in order to advantageously avoid a collision with the other vehicle, or to advantageously reduce the severity of a collision with the other vehicle.

According to another specific embodiment, it may be provided that a further dynamic parameter of another vehicle in the vehicle surroundings of the host vehicle is detected, the assessment criterion being computed based on the further dynamic parameter. This means in particular that at least one other vehicle in the vehicle surroundings of the host vehicle is monitored in such a way that a further dynamic parameter of the other vehicle is detected, the further dynamic parameter being used for estimating whether or not a critical situation is present. Multiple further dynamic parameters of multiple other vehicles may be detected. A driving situation may thus be advantageously recognized and evaluated in a particularly advantageous manner as to whether this driving situation is to be assessed as critical, and whether appropriate countermeasures must be taken.

In another specific embodiment, it may be provided that the dynamic parameter includes a relative speed relative to the host vehicle. The dynamic parameter may include a collision time. A collision time refers in particular to a period of time which must elapse before a collision occurs. A relative speed may in particular be measured based on a Doppler measurement. The speed of the other vehicle and the speed of the host vehicle may be measured, it then being possible to compute the relative speed in particular by an appropriate difference formation.

In another specific embodiment, it may be provided that the relative speed is normalized. This means in particular that the relative speed is divided by a normalized speed, also referred to as a standard speed. The dynamic parameter may then, for example, be equal to the measured relative speed divided by the standard speed. Such a standard speed may in particular represent a lower threshold of a critical classification.

In another specific embodiment, it may be provided that the collision time is normalized by dividing the collision time by a standard collision time. The dynamic parameter may then in particular be the collision time divided by the standard collision time.

According to another specific embodiment, it may be provided that the assessment criterion is computed by multiplying the dynamic parameter by a weighting factor, the further dynamic parameter may be added to the weighted dynamic parameter, in particular the correspondingly formed sum being multiplied by the brake parameter.

The appropriate mathematical formula for assessment criterion λ may be expressed as follows, for example:

$$\lambda = (\alpha_{target}\lambda_1 + \ldots \lambda_n) * a_{brake} \quad (1)$$

where $\lambda_1$ denotes the dynamic parameter of the immediately preceding other vehicle. $\lambda_2$ through $\lambda_n$ correspond to the dynamic parameters of other objects in the vehicle surroundings of the host vehicle. These other objects may be other vehicles, for example. $a_{brake}$ is a measure for the brake pressure applied by the driver, and in this case generally corresponds in particular to the above-mentioned brake parameter corresponding to a requested braking power. $\alpha_{target}$ denotes in particular a weighting factor for taking into account the preceding vehicle, i.e., in particular the relevant potential collision vehicle, relative to the host vehicle.

Dynamic parameters $\lambda_1$ through $\lambda_n$ may be computed as follows:

$$\lambda_i = \frac{v_{relative}}{v_{normalized}} \quad (2)$$

where i=1 ... n. $v_{relative}$ is the measured differential speed, i.e., the relative speed between the host vehicle and the corresponding other vehicle. $v_{normalized}$ represents in particular a lower threshold of a critical classification, i.e., a standard speed.

In another specific embodiment, alternatively or additionally it may optionally be provided that the dynamic parameter is computed based on measured collision times:

$$\lambda_i = \frac{TTC}{TTC_{normalized}} \quad (3)$$

where i=1 ... n. "TTC" is an acronym for the term "time to collision," and stands for a collision time. In this regard, value $TTC_{normalized}$ denotes a corresponding standard collision time, i.e., a corresponding normalization factor.

According to another specific embodiment, it may be provided that the actual vehicle trajectory is adjusted to the setpoint vehicle trajectory only when an instantaneous vehicle speed is in a predetermined speed range. In particular when such a predetermined speed range covers a range between 0 km/h and 50 km/h, critical situations may be advantageously covered, in particular when traveling in a line on expressways or multilane highways.

It is apparent from the above formulas that assessment criterion λ rapidly increases if the relevant collision object, i.e., in particular the immediately preceding vehicle, decelerates. If λ exceeds a predetermined threshold or a predetermined threshold value, a setpoint vehicle trajectory is subsequently computed, the actual vehicle trajectory then being adjusted to the setpoint vehicle trajectory.

In another specific embodiment, it may be provided that the detection unit includes one or multiple video cameras. These video cameras may be mountable in a front area of the vehicle. This means in particular that the video cameras may be installed in a front area of the vehicle. The video cameras may thus monitor an area ahead of the vehicle. Such video cameras may also be referred to in particular as front video cameras.

According to another specific embodiment, it may be provided that the detection unit includes a radar sensor which, for example, is able to sense an area ahead of the vehicle. Additionally or alternatively, a further radar sensor may be provided which is able to detect a side area relative to the vehicle. In the present case, a side area refers in particular to a lateral area relative to the vehicle. Objects in the side area of the vehicle may thus be advantageously recognized.

In another specific embodiment, it may be provided that video sensors are used to recognize objects in the side area of the vehicle.

According to one specific embodiment, it may be provided that a distance between the host vehicle and the other vehicle or the other vehicles is detected, whereby it may be provided that the assessment criterion is computed based on the corresponding distance.

The exemplary embodiments and/or exemplary methods of the present invention are explained in greater detail below with reference to the exemplary embodiments.

DETAILED DESCRIPTION

Figure 1:
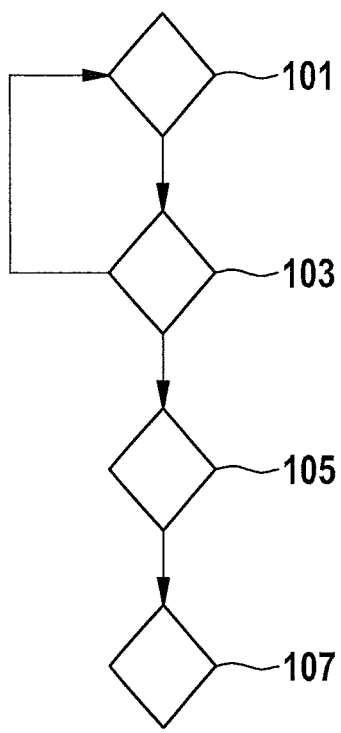
FIG. 1 shows a flow chart of a method for operating a vehicle.

The same reference numerals may be used below for identical features.

FIG. 1 shows a flow chart of a method for operating a vehicle.

A dynamic parameter of a preceding other vehicle is detected according to a step 101. The dynamic parameter may be, for example, a relative speed relative to the vehicle. The dynamic parameter may include a collision time.

An assessment criterion based on the detected dynamic parameter is computed in a step 103. If the assessment criterion is greater than or equal to a predefined threshold value, a setpoint vehicle trajectory is computed in a step 105 as a function of the assessment criterion. An actual vehicle trajectory is then adjusted to the setpoint vehicle trajectory in a subsequent step 107 in particular to advantageously prevent a collision with the preceding vehicle or reduce the severity of a collision.

If the assessment criterion is less than or equal to the predetermined threshold value, step 103 is followed by step 101, i.e., the detection of a dynamic parameter of the preceding other vehicle.

Figure 2:
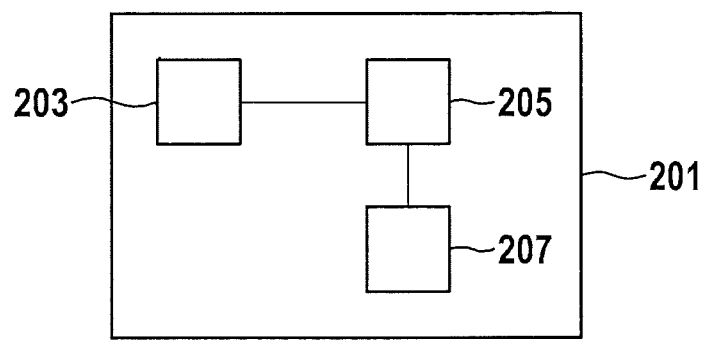
FIG. 2 shows a device for operating a vehicle.

FIG. 2 shows a device 201 for operating a vehicle (not shown).

Device 201 includes a detection unit 203 for detecting a dynamic parameter of a preceding vehicle. In addition, a computing unit 205 is provided which is designed to compute an assessment criterion based on the detected dynamic parameter. Computing unit 205 is also designed to compute a setpoint vehicle trajectory as a function of the assessment criterion. Device 201 also includes a control unit 207 for adjusting an actual vehicle trajectory to the setpoint vehicle trajectory.

Control unit 207 may be connected to actuators of a steering system of the vehicle, not shown here, so that control unit 207 in particular is designed to autonomously or semi-autonomously steer the vehicle. Control unit 207 may be connected to further actuators of a drive system of the vehicle, so that the control unit for adjusting the actual vehicle trajectory to the setpoint vehicle trajectory may advantageously accelerate the vehicle. In particular, it may be provided that control unit 207 is connected to further actuators of a braking system of the vehicle. Thus, control unit 207 for adjusting the actual vehicle trajectory to the setpoint vehicle trajectory may advantageously decelerate the vehicle.

In one specific embodiment not shown, it may be provided that detection unit 203 has one or multiple front video cameras which may sense a front area ahead of the vehicle, i.e., an area situated ahead of the vehicle. Detection unit 205 may include radar sensors which sense an area ahead of the vehicle and/or sense a lateral area of the vehicle. In particular, a video sensor may be provided for lateral detection of a vehicle surroundings. In particular, multiple video sensors may be provided. With the aid of the above-mentioned sensor system, i.e., in particular radar sensors and video sensors and the front video camera(s), it is advantageously possible in particular to recognize objects in the side area and in the front area of the vehicle.

Figure 3:
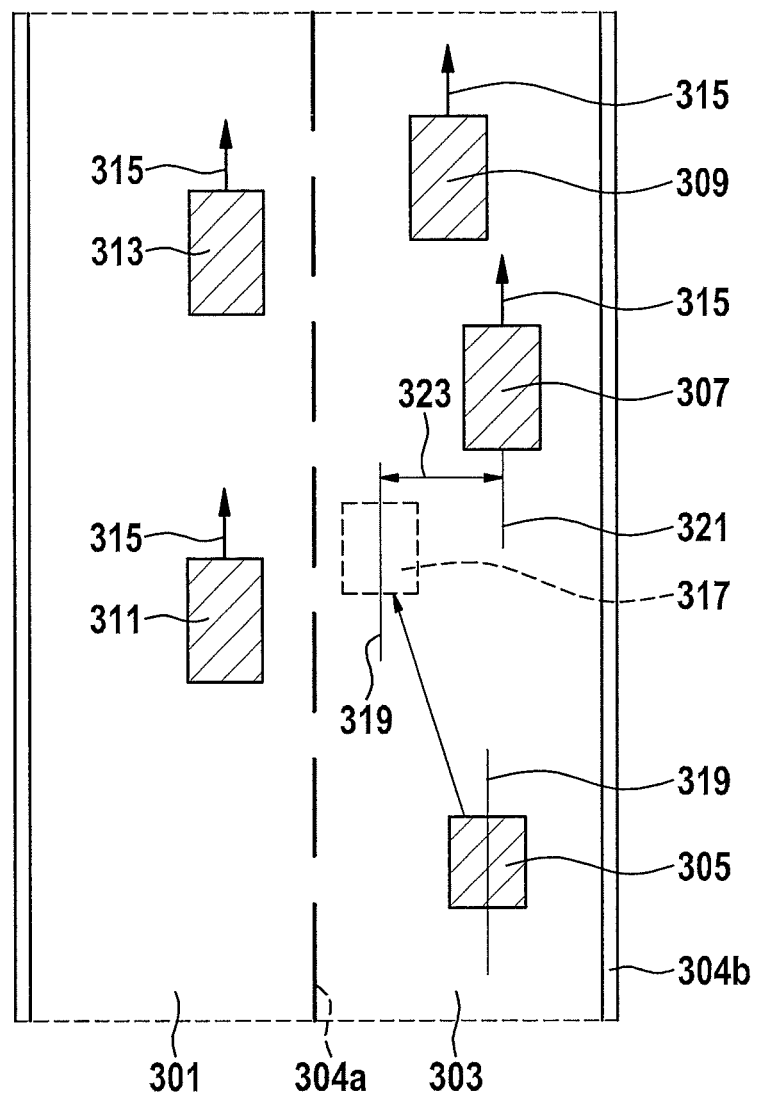
FIG. 3 shows two lanes having a vehicle which includes the device for operating a vehicle according to FIG. 2.

FIG. 3 shows two adjacently extending lanes 301 and 303 having appropriate lane markings 304a and 304b. This means that lane 303 is delimited by the two lane markings 304a and 304b. Lane 301, which extends to the immediate left of lane 303, is delimited by lane marking 304a. A further lane marking for delimiting lane 301 from further lanes, not shown here, is not shown in FIG. 3 for the sake of clarity.

A vehicle 305 which includes device 201 according to FIG. 2 is traveling in lane 303. For the sake of clarity, device 201 is not depicted in FIG. 3.

In addition, four other vehicles 307, 309, 311, and 313 are traveling in the two lanes 301 and 303. In this regard, vehicle 307 is traveling directly ahead of vehicle 305 in lane 303. Vehicle 309 is traveling ahead of vehicle 307, likewise in lane 303. The two vehicles 311 and 313 are traveling in left lane 301, with vehicle 313 ahead of vehicle 311.

A corresponding forward movement of vehicles 307, 309, 311, and 313 is symbolically denoted by an arrow having reference numeral 315.

Device 201 of vehicle 305 detects dynamic parameters of vehicles 307, 309, 311, and 313. These dynamic parameters may include, for example, a relative speed in each case. The dynamic parameters may include a collision time in each case.

An assessment criterion $\lambda_i$, where i=1, 2, 3, 4, is computed based on the detected dynamic parameters. The computation is carried out according to the following mathematical formula, for example:

$$\lambda = (\alpha_{target}\lambda_1 + \lambda_2 + \lambda_3 + \lambda_4) * a_{brake}$$

where $\lambda$ stands for the assessment criterion. $\alpha_{target}$ is a weighting factor for taking into account the relevant potential collision vehicle, in the present case, immediately preceding vehicle 307, relative to vehicle 305. $a_{brake}$ is a brake parameter corresponding to a requested braking power.

$\lambda_i$, where i=1, 2, 3, 4, may be computed according to the following mathematical formula:

$$\lambda_i = \frac{V_{relative}}{V_{normalized}}$$

where $v_{relative}$ denotes the corresponding differential speed between vehicle 305 and respective vehicles 307, 309, 311, and 313. $V_{normalized}$ represents a lower threshold of a critical classification, and in this regard is a normalization speed value or standard speed.

Alternatively or additionally, it may optionally be provided to compute $\lambda_i$ based on measured collision values. This may be carried out using the following mathematical formula:

$$\lambda_i = \frac{TTC}{TTC_{normalized}}$$

where $TTC_{normalized}$ represents a collision normalization time or standard collision time, and in this regard likewise represents a lower threshold of a critical classification.

If, for example, the relevant collision object, in the present case in particular immediately preceding vehicle 307, brakes heavily, assessment criterion $\lambda$ rapidly increases. If $\lambda$ exceeds a predetermined threshold value, a setpoint vehicle trajectory is computed, the actual vehicle trajectory then being adjusted to the setpoint vehicle trajectory in order to advantageously avoid a collision with preceding vehicle 307. A setpoint position of vehicle 305 on the setpoint vehicle trajectory of vehicle 305 is symbolically denoted here by reference numeral 317.

In this regard, the setpoint vehicle trajectory is selected and computed in particular in such a way that a distance between a longitudinal axis 319 of vehicle 305 and a longitudinal axis 321 of vehicle 307 is a maximum without vehicle 305 crossing lane marking 304a, in order to advantageously prevent a collision with vehicles 311 and 313 in lane 301.

If device 201 of vehicle 305 detects and recognizes that no vehicles are present in lane 301 to the side of vehicle 305, a setpoint vehicle trajectory may also correspondingly be situated in lane 301 so that vehicle 305 may autonomously also move into lane 301 in order to avoid a collision with preceding vehicle 307. This means in particular that vehicle 305 may also be positioned in lane 301 in order to prevent a collision with vehicle 307.

In one specific embodiment not shown, it may be provided that a distance between vehicle 305 and the other vehicles 307, 309, 311, and 313 is detected in each case, $\lambda$ being computed in particular as a function of the distances. This means in particular that the distances may additionally be taken into account in the above formula.

The above statements with regard to FIG. 3 similarly apply in particular for more or fewer than four other vehicles.

In summary, the exemplary embodiments and/or exemplary methods of the present invention include in particular the concept of changing a setpoint vehicle trajectory, in the present case in particular a lateral position and an orientation in one lane, when a critical driving situation occurs. The occurrence of such a critical driving situation is defined in this way in particular if the assessment criterion exceeds a predefined or predetermined threshold value. In this case, the setpoint vehicle trajectory is then computed in such a way that the vehicle moves into a safe lane area. In this way a collision is advantageously prevented, or, in the event of a collision, a favorable orientation is advantageously brought about.

Moreover, the exemplary embodiments and/or exemplary methods of the present invention include in particular the concept that, by determining the assessment criterion for the critical situation, a setpoint lane position, i.e., the setpoint vehicle trajectory, is selected in such a way that the distance from the vehicles involved in the situation is maximized. This means in particular that a distance between the corresponding longitudinal axes may be maximized. In particular for intense deceleration processes in vehicles traveling in a line, this results in a greater feeling of safety for the driver. The response of the device, i.e., an appropriate system response, is closer to the driver's behavior. A positive influence on the critical traffic situation is thus advantageously to be expected. This advantageously results in a higher level of acceptance of the system by the driver.

In this regard, in the exemplary embodiments and/or exemplary methods of the present invention, in particular for the first time in a lane keeping support (LKS) system, i.e., a steering assistance system, the vehicle orientation in critical situations is influenced in such a way that a system behavior similar to a driver response results. This results in a higher level of acceptance of the system by the driver. In presently known systems, the LKS system is deactivated during a recognized critical situation, for example an ABS control intervention or heavy braking. For situations in which other vehicles move in front of the host vehicle, in the related art this does not result in a change in system behavior, and the central setpoint lane position is maintained. Traveling in a line is a situation that frequently occurs on expressways. If this line is moving at low average speeds, the lane change rate is very high, and intense decelerations of the vehicles often occur, also in the direction of longitudinal motion. With the aid of the exemplary embodiments and/or exemplary methods of the present invention, however, rapid and reliable response to such situations is made possible, and in this regard, in the present case the vehicle is adjusted to a safe setpoint vehicle trajectory.

What is claimed is:

1. A method for operating a host vehicle, the method comprising:
   detecting a dynamic parameter of a preceding vehicle traveling ahead of the host vehicle;
   detecting an actual amount of braking power that has been requested at the host vehicle;
   computing an assessment criterion based on the detected dynamic parameter and based on the detected actual amount of braking power that has been requested;

computing a setpoint vehicle trajectory as a function of the assessment criterion, wherein the setpoint vehicle trajectory is computed to prevent a collision between the host vehicle and the preceding vehicle by:
  moving the host vehicle from a current lane of travel into an adjacent lane when the adjacent lane is free of objects that would collide with the host vehicle, and
  keeping the host vehicle in the current lane while maximizing a distance between a longitudinal axis of the host vehicle and a longitudinal axis of the preceding vehicle when the adjacent lane is not free; and
adjusting an actual vehicle trajectory to the setpoint vehicle trajectory.

2. The method of claim 1, further comprising:
detecting a vehicle surroundings of the adjacent lane, and
based on the detected vehicle surroundings, forming a permissible range for the setpoint vehicle trajectory which includes the adjacent lane.

3. The method of claim 1, further comprising:
detecting lane markings of the current lane of the host vehicle, wherein the keeping of the host vehicle in the current lane includes forming a permissible range for the setpoint vehicle trajectory which is within the lane markings.

4. The method of claim 1, wherein the actual amount of braking power that has been requested is requested by a driver of the vehicle.

5. The method of claim 4, wherein the actual amount of braking power that has been requested is detected based on a pressure with which the driver actuates a brake pedal.

6. The method of claim 1, further comprising:
detecting a further dynamic parameter of another vehicle in the vehicle surroundings of the host vehicle besides the preceding other vehicle, and
computing the assessment criterion based on the further dynamic parameter.

7. The method of claim 1, wherein the dynamic parameter includes a relative speed relative to at least one of the host vehicle, a collision time, and a distance.

8. The method of claim 1, wherein the actual vehicle trajectory is a three-dimensional curve along which the vehicle is moving, and the setpoint vehicle trajectory is a computed three-dimensional curve along which the vehicle is supposed to move.

9. A method for operating a host vehicle, the method comprising:
detecting a dynamic parameter of a preceding other vehicle;
detecting an actual amount of braking power requested at the host vehicle;
computing an assessment criterion based on the detected dynamic parameter and based on the actual amount of braking power requested;
computing a setpoint vehicle trajectory as a function of the assessment criterion;
adjusting an actual vehicle trajectory to the setpoint vehicle trajectory, wherein the dynamic parameter includes a relative speed relative to at least one of the host vehicle, a collision time, and a distance;
multiplying the dynamic parameter by a weighting factor;
detecting a further dynamic parameter of another vehicle in the vehicle surroundings of the host vehicle besides the preceding other vehicle; and
computing the assessment criterion by adding the further dynamic parameter to the weighted dynamic parameter, and multiplying the correspondingly formed sum by a brake parameter corresponding to the actual amount of braking power requested.

10. The method of claim 9, wherein the actual vehicle trajectory is a three-dimensional curve along which the vehicle is moving, and the setpoint vehicle trajectory is a computed three-dimensional curve along which the vehicle is supposed to move.

11. A device for operating a host vehicle, comprising:
a detection unit configured to detect a dynamic parameter of a preceding vehicle traveling ahead of the host vehicle, and to detect an actual amount of braking power that has been requested at the host vehicle;
a computing unit configured to compute an assessment criterion based on the detected dynamic parameter and based on the detected actual amount of braking power that has been requested, and to compute a setpoint vehicle trajectory as a function of the assessment criterion, wherein the setpoint vehicle trajectory is computed to prevent a collision between the host vehicle and the preceding vehicle by:
  moving the host vehicle from a current lane of travel into an adjacent lane when the adjacent lane is free of objects that would collide with the host vehicle, and
  keeping the host vehicle in the current lane while maximizing a distance between a longitudinal axis of the host vehicle and a longitudinal axis of the preceding vehicle when the adjacent lane is not free; and
a control unit configured to adjust an actual vehicle trajectory to the setpoint vehicle trajectory.

12. The device of claim 11, wherein the actual vehicle trajectory is a three-dimensional curve along which the vehicle is moving, and the setpoint vehicle trajectory is a computed three-dimensional curve along which the vehicle is supposed to move.

13. The device of claim 11, wherein a vehicle surroundings of the adjacent lane is detected, and wherein based on the detected vehicle surroundings, a permissible range for the setpoint vehicle trajectory, which includes the adjacent lane, is performed.

14. A non-transitory computer readable medium having a computer program, which is executable by a processor, comprising:
a program code arrangement having program code for operating a host vehicle, by performing the following:
detecting a dynamic parameter of a preceding vehicle traveling ahead of the host vehicle;
detecting an actual amount of braking power that has been requested at the host vehicle;
computing an assessment criterion based on the detected dynamic parameter and based on the detected actual amount of braking power that has been requested;
computing a setpoint vehicle trajectory as a function of the assessment criterion, wherein the setpoint vehicle trajectory is computed to prevent a collision between the host vehicle and the preceding vehicle by:
  moving the host vehicle from a current lane of travel into an adjacent lane when the adjacent lane is free of objects that would collide with the host vehicle, and
  keeping the host vehicle in the current lane while maximizing a distance between a longitudinal axis of the host vehicle and a longitudinal axis of the preceding vehicle when the adjacent lane is not free; and
adjusting an actual vehicle trajectory to the setpoint vehicle trajectory.

15. The non-transitory computer readable medium of claim 14, wherein the actual vehicle trajectory is a three-dimensional curve along which the vehicle is moving, and the setpoint vehicle trajectory is a computed three-dimensional curve along which the vehicle is supposed to move.

16. The non-transitory computer readable medium of claim 14, wherein a vehicle surroundings of the adjacent lane is detected, and wherein based on the detected vehicle surroundings, a permissible range for the setpoint vehicle trajectory, which includes the adjacent lane, is performed.

* * * * *